United States Patent Office 3,686,183
Patented Aug. 22, 1972

3,686,183
PREPARATION OF OPTICAL ISOMERS OF ARYLALKYLACETIC ACIDS
Norman H. Dyson, Palo Alto, Calif., assignor to Syntex Corporation, Panama, Panama
No Drawing. Filed Mar. 24, 1969, Ser. No. 809,957
Int. Cl. C07c *5/04;* C07d *43/54*
U.S. Cl. 260—284
11 Claims

ABSTRACT OF THE DISCLOSURE

Solutions of α-substituted d- or l-arylacetic acid salts of asymmetric optically active nitrogeneous bases are heated to elevated temperatures to cause racemization. By repeated crystallization and racemization steps with final conversion to the acid, a dl-acid can be converted to an optically specific d- or l-acid. The α-substituted arylacetic acids are useful as anti-inflammatory, analgesic, antipyretic and anti-pruritic agents.

This invention relates to a process of racemizing an α-substituted d- or l-arylacetic acid, the racemization step being accomplished by heating a solution of an asymmetric, optically active nitrogeneous base salt of the acid. This invention also relates to combinations of racemizing steps and resolving (crystallizing) steps for producing optically specific α-substituted d- or l-arylacetic acids from dl acids.

Prior to this invention, racemization of optically specific carboxylic acids was accomplished by several specific techniques. The oldest method, thermal racemization of the free acid, is inefficient. Treatment of the free acid or acid ester with an excess of strong base was usually preferred. In the latter processes, the compound to be racemized was dissolved in water or an organic solvent and heated in the presence of excess base until the desired racemization occurred. Organic acids were usually racemized as a lower alkyl ester or metal salt in an alkali metal hydroxide solution. Since the resolution was accomplished by crystallizing optically active nitrogeneous base salts of the acids, the racemization was usually accomplished with metal salts or alkyl esters of the acids, conversion of a dl-acid to an optically specific acid required repeated conversions of nitrogeneous base salts to metal salts or alkyl esters for racemization and back to the nitrogeneous base salts for resolution.

It is an object of this invention to provide a simplified, more efficient method for obtaining optically specific α-substituted arylacetic acids from dl-mixture of the acids, the key step being a novel thermal racemization of an asymmetric, optically active nitrogeneous base salt of the acid in organic solution. By means of a series of racemization and resolution steps with the acid remaining as the salt of the nitrogeneous base during both operations, a dl-acid mixture can be completely converted to a desired optically specific d- or l-acid as is more specifically described hereinafter.

The racemization step of this invention, in general, comprises maintaining a solvent solution containing a salt of an α-substituted, predominately d- or l-arylacetic acid and an optically active nitrogeneous base at a racemizing temperature until racemization occurs, thus forming a solution of a salt of racemized arylacetic acid and nitrogeneous base. Excess base need not be present in this procedure. Some excess base can be present, however, although it has not been found to increase the efficiency of the racemization step.

The α-substituted arylacetic acids racemized and resolved in the process of this invention have at the asymmetric α-carbon a hydrogen atom and a non-aromatic substituent other than hydrogen in addition to the aryl group. The α-carbon is bound to an aromatic ring of the aryl group.

The identity of the non-aromatic substituent and aryl group is not critical in the racemization step of the process of this invention. The aryl group can be any aromatic hydrocarbon group including groups derived from benzene, naphthalene, anthracene, phenanthrene, indene, diphenyl, fluorene, fluoranthene, chrysene and, for example, the corresponding lower alkyl, hydroxyl, lower alkoxy, and halo substituted analogs thereof.

The process of this invention is particularly efficient for racemizing naphthalene acetic acids such as those represented by Formula I.

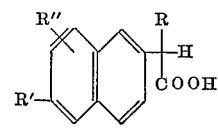

wherein R is methyl, ethyl, difluoromethyl, fluoro or chloro and R' and R" (at position 1, 4, 5, 7 or 8) each is hydrogen, hydroxy, conventional hydrolyzable esters thereof, fluoro, chloro, lower alkyl, oxyether, or thioether.

The term "(lower)alkyl" and derivatives thereof appearing in the above definitions and elsewhere in the instant specification denote alkyl groups containing from 1 to 6 carbon atoms, inclusive, such as methyl, ethyl, propyl, isopropyl, butyl, isobutyl, t-butyl, pentyl, amyl, hexyl, and the like.

The term "conventional hydrolyzable ester" as used herein denotes those hydrolyzable ester groups conventionally employed in the art, and preferably those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functionl groups, for example, hydroxy, alkoxy containing up to six carbon atoms, acyloxy having up to 12 carbon atoms, nitro, amino, halogeno, and the like, attached to the hydrocarbon backbone chain. Typical conventional hydrolyzable esters thus included with the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t - butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, dihydrogen, phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

The term "oxyether" as used herein denotes those ether groups conventionally employed in the arylacetic acid art, preferably derived from normal chain, branched chain, aromatic hydrocarbons and oxo heterocyclic hydrocarbons. The term "hydrocarbon" includes both saturated and unsaturated hydrocarbons. These hydrocarbons are optionally substituted with groups such as hydroxy;

alkoxy such as straight or branched chain hydrocarbon ether groups of six or less carbon atoms including methoxy, ethoxy, 2-propoxy, butoxy, 3-pentoxy and the like; halo groups such as bromo, iodo, chloro, or fluoro; and lower arylthio such as straight or branched chain hydrocarbon thioether groups of six or less carbon atoms including methylthio, ethylthio, propylthio, 2 - propylthio, 2-butylthio, pentylthio, 3-hexylthio, and the like. Preferably the hydrocarbons contain from 1 to 12 carbon atoms. Typical oxo ethers thus include lower alkoxy, difluoromethoxy, lower alkoxymethoxy, lower alkylthiomethyloxy, tetrahydrofuran-2'-yloxy, tetrahydropyran-2'-yloxy, 4'-(lower)-alkoxytetrahydropyran-4'-yloxy, and the like.

The term "thioether" as used herein denotes those ether groups conventionally employed in the art, preferably those derived from normal chain, branched chain, cyclic and aromatic hydrocarbons. These hydrocarbons are optionally substituted with groups such as hydroxy, lower alkoxy, lower arylthio, halo, and the like, the latter groups including the groups described above with respect to the term "oxyether." The hydrocarbons preferably contain from 1 to 12 carbon atoms. Typical thioethers thus include lower alkylthio, dimethylthio, lower alkoxymethylthio, lower alkylthiomethylthio, and the like.

The compounds of Formula I and methods for their preparation are described in applications Ser. No. 694,771, filed Dec. 7, 1967 and Ser. No. 741,858, filed July 2, 1968 as briefly described hereinafter.

One such method by which the compounds of Formula I can be prepared involves the reaction of an unsubstituted or substituted naphthalene with acetyl chloride in nitrobenzene in the presence of about three molar equivalents of aluminum chloride to afford the corresponding 2-acetylnaphthalene derivative. The resulting derivative is heated with morpholine in the presence of sulfur at 150° C., and the resulting product is refluxed with concentrated hydrochloric acid to furnish the corresponding 2-naphthylacetic acid derivative.

The starting naphthalene compound for this procedure can be represented by the following formula:

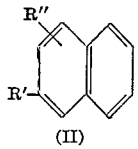

(II)

wherein R' and R" are as defined above. The naphthalenes of Formula II are known in the art and can be prepared by conventional means known in the art.

The 2-naphthylacetic acids are then esterified to form the corresponding esters, for example by reacting them with an alkanol in the presence of boron trifluoride. The ester is treated with an alkali metal hydride in an ether solvent and then with an alkyl halide such as methyl iodide to provide the corresponding 2-(2'-naphthyl)-2-alkylacetic acid esters. The latter can be hydrolyzed in an aqueous basic solution to obtain the corresponding 2-(2'-naphthyl)-2-alkyl acetic acids. Prior to this procedure, hydroxy groups are etherified and carboxy groups are esterified to protect them from attack by reagents. Such protected groups can be regenerated by hydrolysis after the process.

The α-difluoromethyl group can be introduced by treating the 2-naphthylacetic acid ester derivatives with an alkali metal or alkali metal hydride in a dialkyl carbonate, such as diethyl carbonate, to afford the corresponding α-alkoxycarbonyl derivatives. The latter is treated with chlorodifluoromethane and an alkali metal alkoxide, such as potassium t-butoxide, in an ether solvent, preferably 1,2-dimethoxyethane, to afford the corresponding 2-alkoxycarbonyl-2-difluoromethyl derivatives, which are hydrolyzed to furnish the corresponding 2-(2'-naphthyl)-2-carboxy-2-difluoromethylacetic acid derivatives. The deesterified product is decarboxylated by heating at a temperature of between 30° C. and 150° C. until the evolution of carbon dioxide ceases, to yield the corresponding 2-(2'-naphthyl)-2-difluoromethylacetic acid derivatives.

The α-fluoro group is introduced by treating the 2-naphthylacetic acid ester derivatives with two or more equivalents of an alkyl formate, such as ethyl formate, and three or more equivalents of an alkali metal or alkali metal hydride in a hydrocarbon solvent to afford the corresponding α-hydroxymethylene derivatives, which are treated with an equivalent of an alkali metal hydride and one equivalent of perchloryl fluoride to afford the corresponding 2-fluoro-2-formyl derivatives. The latter are oxidized by conventional means, such as with chromium trioxide in glacial acetic acid or 8 N sulfuric acid, to furnish the corresponding 2-fluoro-2-carboxy derivatives which are decarboxylated by heating to temperatures of 100° C. or more to afford the corresponding 2-(2'-naphthyl)-2-fluoroacetic acid ester derivatives. The corresponding α-chloro derivatives are prepared by utilizing chlorine in place of perchloryl fluoride in the above process.

The hydroxy (hydroxymethyl, conventionally hydrolyzable ester, alkoxymethyloxy, alkylthiomethyloxy, tetrahydrofuran-2"-yloxy, tetrahydropyran-2"-yloxy, 4"-alkoxytetrahydrofuran-4"-yloxy, alkoxymethylthio and alkylthiomethylthio can also be introduced after the introduction of substituents at the 2-position of the 2'-naphthylacetic acid derivatives.

Those compounds containing a trifluoromethyl group can be prepared from the corresponding methyl substituted 2-naphthylacetic acid ester derivatives by treating the latter with chlorine and phosphorus trichloride in the presence of light to afford the corresponding trichloromethyl derivatives, which, when refluxed with antimony trifluoride in a hydrocarbon solvent, furnish the corresponding trifluoromethyl substituted 2-naphthylacetic acid ester derivatives.

Those compounds containing difluoromethoxy groups are preferably prepared from the corresponding alkoxy substituted 2-naphthylacetic acid ester derivatives by refluxing the latter with 48 percent hydrobromic acid in acetic acid to furnish the free hydroxy derivatives which, upon treatment with chlorodifluoromethane and an alkali metal hydroxide in aqueous dioxane or tetrahydrofuran, affords the corresponding difluoromethoxy substituted 2-naphthylacetic acid ester derivatives.

By utilizing alkylthio 2-naphthylacetic acid ester derivatives in the above process, the corresponding difluoromethylthio derivatives are obtained.

The hydroxy groups are etherified by conventional methods, for example, by treatment with an alkali metal hydride and then with an alkyl halide, preferably an alkylbromide or iodide, or by treatment with a diazoalkane or an alkanol in the presence of boron trifluoride in an ether solvent, and the like.

The alkoxymethyloxy groups are introduced by treating the hydroxy substituted 2-naphthylacetic acid derivatives with an alkoxychloromethane in dimethylformamide to afford the corresponding alkoxymethyloxy substituted 2-naphthylacetic acid derivatives. The alkylthiomethyloxy substituted 2-naphthylacetic acid derivatives are prepared by utilizing an alkylthiochloromethane in the above process.

The alkoxymethylthio substituted 2-naphthylacetic acid derivatives are prepared by refluxing thio substituted 2-naphthylacetic acid derivatives with an alkoxychloromethane in dimethylformamide. The alkylthiomethylthio substituted derivatives are prepared by using an alkylthiochloromethane in place of alkoxychloromethane in the above process.

The compounds containing tetrahydrofuran-2'-yloxy, tetrahydropyran-2'-yloxy, or 4'-alkoxytetrahydropyran-4'-yloxy groups are preferably prepared from the corresponding hydroxy 2-naphthylacetic acid ester derivatives by treatment with dihydrofuran, dihydropyran, or 4'-alkoxydihydropyran, such as 4'-methoxydihydropyran, in the presence of an acid catalyst.

The compounds containing hydroxy ester groups are prepared from the hydroxy derivatives by conventional esterification means, such as by heating with an acid anhydride.

The asymmetric optically active nitrogenous bases which can be used in the process of this invention can be either natural or synthetic. They must be capable of forming a salt with α-substituted arylacetic acids according to this invention. Examples of suitable nitrogenous bases include cinchonine, cinchonidine, quinine, quinidine, strychnine, brucine, morphine, 1-methylamine, d-α-phenylethylamine, 1-α-phenylethylamine, d-2-amino-1-hydroxyhydrinidine, 1-arginine, dehydroabietylamine, cinchonicine, d-α-(1-naphthyl)ethylamine, 1-α-(1-naphthyl)ethylamine, d-α-methylbenzylamine, 1-α-methylbenzylamine, caffeine, L-2-amino-1-propanol, 1-2-aminobutanol, d-2-amino-butanol, D-threo-2-amino-1-p-nitrophenyl-1,3-propanediol, d-amphetamine, d-methylamine, 1-methylamine, cholesterylamine, N-cholesteryl aniline, L-2-benzylamino-1-propanol, d-desoxyephedrine, 1-ephedrine, d-dimethylamino-1,2-diphenyl-3-methyl-2-butanol, 1-dimethylamino-1,2-diphenyl-3-methyl-2-butanol, glucosamine, solanidine, conessine, anabasine, and the like.

The racemization solvent system used in the process of this invention can be any conventional, inert organic solvent in which the α-substituted arylacetic acid salts of the asymmetric optically active nitrogenous bases are soluble. Examples of such solvents include acetone, acetyl acetone, adiponitrile, 2-amino-2-methyl-1-propanol, benzonitrile, benzothiazole, benzyl alcohol, benzyl mercaptan, butyl alcohol, capryl alcohol, diacetone alcohol, diethanolamine, mono- and di(lower) alkyl ethers of ethylene glycol and diethylene glycol, di-N-propylaniline, ethanol, methanol, n-propanol, i-propanol, ethyl isothiocyanate, ethylene glycol, 1,2-propylene glycol, 1,3-propylene glycol, 2-ethylhexanol, dimethylsulfoxide, sulfolanes, dimethylformamide, N-methylpyrollidine, formamide, furfuryl alcohol, glycerol, hydroxyethylethylenediamine, isoamyl alcohol, isoamyl sulfide, isobutyl mercaptan, methyl disulfide, dibutoxytetraethylene glycol, pyridine, trimethylene glycol, dioxane, dimethyl acetamide, and the like. The preferred racemization solvents are polar and have a boiling point above 90° C., preferably boiling at temperatures above 110° C.

Preferred racemizing solvents include dimethylacetamide, ethylene glycol, pyridine and the like.

The racemization proceeds at a reasonable rate at temperatures above 80° C. The rate at which a particular α-substituted arylacetic acid is racemized is a direct function of the temperature; the higher the temperature, the faster the racemization rate. The maximum racemizing temperature is the highest temperature at which the arylacetic acid is not degraded. Preferably, the racemizing temperature is insufficient to significantly degrade the asymmetric optically active nitrogenous base. Preferred racemizing temperatures for most arylacetic acid salts of nitrogeneous bases are within the range of from 100 to 170° C. A temperature of between 110 to 125° C. is generally found to be the most satisfactory.

To minimize degradation of the salt, the racemization (and resolution) steps of this invention are preferably conducted in an inert atmosphere such as nitrogen.

The resolution step of this invention, in general, comprises crystallizing an α-substituted arylacetic acid salt of an asymmetric optically active nitrogeneous base from a crystallization solvent solution of the salt of the acid and nitrogeneous base. This step is designed to yield crystals of the salt containing a greater proportion of d- or l-arylacetic acid salt than the solution from which it is crystallized. A solution of predominately the opposite optical isomer (l- or d-arylacetic acid) is left. Which of the d-arylacetic acid salt or l-arylacetic acid salt of the nitrogenous base is crystallized from the solution depends upon the choice of solvent for any particular salt. The term "crystallization solvent" is defined as being a solvent which will effect resolution of a specific salt of a dl-α-substituted arylacetic acid and an asymmetric, optically active nitrogeneous base when the latter is crystallized therefrom. The d-arylacetic acid salt of the nitrogeneous base is crystallized from the solution, leaving a solution of predominately an l-arylacetic acid salt when the d-arylacetic acid salt of the nitrogeneous base is less soluble in the crystallization solvent than the corresponding salt of the l-arylacetic acid. Corresponding crystals of predominately l-arylacetic acid salt are obtained, leaving a solution of predominately d-arylacetic acid salt when the l-arylacetic acid salt of the nitrogeneous base is less soluble in the crystallization solvent than the corresponding salt of the d-arylacetic acid.

In general, resolution by crystallization is achieved by cooling a nearly saturated solution of the arylacetic acid salt of a nitrogeneous base to a temperature at which the solution becomes supersaturated with the salt. Continued cooling causes continued crystallization of the dissolved salt. Preferably, the solution is seeded with small quantities of the least soluble optical form of the arylacetic acid salt of the nitrogeneous base during the cooling since this promotes higher resolution and increased yields of the desired optical active form of the acid. The initial and final temperatures of the crystallization solvent are chosen primarily by practical consideration as long as the temperature will not significantly degrade the arylacetic acid or asymmetric optically active nitrogeneous base. For example, the nearly saturated solution of the dl-arylacetic acid can have an initial temperature of from 50 to 100° C. and can be cooled to a final temperature of from 10 to 40° C., the temperature difference being sufficient to provide a high yield of crystals. The crystallizing mixture is maintained at the lower temperatures until crystallization is complete or nearly so, usually for longer than 15 minutes and preferably from 0.5 to 2 hours. The crystals are separated from the resultant mixture, for example, by filtration, leaving the mother liquor containing (as the salt) predominately the optical form of arylacetic acid opposite that of the crystals. The mother liquor is then further processed.

With any particular arylacetic acid salt of a particular asymmetric, optically active nitrogeneous base, the solvent is selected to yield the desired optical form of arylacetic acid salt as crystals. A solvent in which a d-form of an arylacetic acid and a particular nitrogeneous base is least soluble, for example, might be suitable for crystallizing d-salts of another nitrogeneous base. Salts of α-substituted naphthalene acetic acids and cinchonidine yield a least soluble d-acid salt in methanol and dimethylacetamide, for example, whereas some naphthalene acetic acids such as the 2-(2'-naphthyl)propionic acid salt of cinchonidine form a least soluble l-acid salt in ethanol. The α-substituted naphthalene acetic acid salts of naphthylethylamine, cinchonine and quinine, in general form least soluble d-acid salts in methanol. The corresponding acid salts of dehydroabietylamine form least soluble l-acid salt in methanol. Selection of solvent systems providing the desired least soluble salt is routine and conventional in the art.

Recrystallization of the above-obtained crystals of the α-substituted arylacetic acid salt of the nitrogeneous base containing a greater proportion of the d- or l-salt than the solution from which it is crystallized provides crystals having a higher purity (greater resolution) than the original crystals. The recrystallization can be carried out using the same solvents and same procedure followed in the initial crystallization step or with different solvents as found desirable. A second recrystallization will yield a product salt having an even greater optical purity.

The combined mother liquors from each of the crystallization steps can be reprocessed.

The above racemizing and resolving process steps can be used in several combinations of sequences as found desirable under particular circumstances. Although the sequences are described as procedures for producing d-acids, for example for obtaining d-2(6'-methoxy-2'-naphthyl)-propionic acid from the corresponding dl-acid using a chinchonidine base and a dimethylacetamide solvent, it should be readily apparent that by selection of an appropriate base-solvent system, the sequence is equally applicable for obtaining the l-acids.

(1) dl-acid mixture is reacted with a nitrogeneous base, the resultant salt is resolved by crystallizing predominately d-acids salt from a first crystallization solvent, and the crystals are separated, leaving a mother liquor of predominately l-acid salt.

(2) The predominately d-acid salt is recrystallized one or more times to purify it, yielding a pure d-acid acid and further mother liquor containing predominately l-acid salt. (The salt can be cleaved to yield the d-acid and recover the nitrogeneous base.)

(3) The combined mother liquor from the above steps racemized in a first racemization solvent to yield a dl-acid salt mixture.

(4) The resultant dl-acid salt mixture is resolved in a second crystallization solvent. It can be separately resolved or, preferably, the combined mother liquors can be recycled to the original dl-acid salt mixture (Step 1) for resolution. In the latter instance the second and first crystallization solvents are the same. The resolved predominately d-acid salt crystals are separated, leaving further mother liquor containing predominately l-acid salt crystals.

(5) The mother liquor from Step 4 can be racemized in a second racemization solvent to yield a dl-acid salt mixture. The step can be carried out with the mother liquor from Step 4 by itself, or the mother liquor can be recycled to the first racemization solvent (Step 3), in which instance the second and first racemization solvents are the same.

(6) dl-acid salt mixture from Step 5 is crystallized in a third crystallization solvent to yield predominately d-acid salt leaving a mother liquor of predominately l-acid salt. This racemization can be carried out separately, or it can be carried out in previous crystallization solvents as a result of recycle with the mother liquor prior to racemization or the racemized solution prior to resolution. In the first instance, the first and second racemization solvents and the second and third crystallization solvents would be the same. In the latter instance, the second and third crystallization solvents are the same or, if recycling to Step 1 is arranged, the third and first crystallization solvents are the same.

(7) The purified arylacetic acid-nitrogeneous base salt crystals are then acidified and extracted to yield the purified, optically specific arylacetic acid.

It should be readily apparent from the above that the racemizing and resolution steps of this invention can be combined in many other combinations and variations to provide the most efficient and economical procedure for obtaining an optically specific d- or l-acid from the corresponding dl-acid. Further variations can be obtained by mixing the crystalline products of Steps 4 and 6 or their recrystallized products with crystals of comparable purity obtained in Step 1 or 2.

The process of this invention is further illustrated by the following specific but non-limiting examples.

EXAMPLE 1

A solution of 1.5 g. of enriched 1-2-(6'-methoxy-2'-naphthyl)-propionic acid salt of cinchonidine in 6 ml. of dimethylacetamide containing 5 percent water was maintained at a temperature of 115° C. under a nitrogen atmosphere for 24 hours. At the end of this time, the solution contained the dl - 2-(6'-methoxy-2'-naphthyl)-propionic acid astl of cinchonidine. The original enriched 1- 2 - (6' - methoxy - 2' - naphthyl)propionic acid had a $[\alpha]_D^{25} = -32°$ (c.=1.0 in $CHCl_3$). The dl-2-(6'-methoxy-2'-naphthyl)propionic acid had a $[\alpha]_D^{25} = \pm 0°$ (c.=1.0 in $CHCl_3$).

EXAMPLE 2

Repeating the procedure of Example 1 with solutions of 1 - 2-(6'-methoxy-2'-naphthyl)propionic acid salt of chinchonidine in each of acetone, acetyl acetone, adiponitrile, 2-amino-2-methyl-1-propanol, benzonitrile, benzothiazole, benzyl alcohol, benzyl mercaptan, butyl alcohol, capryl alcohol, diacetone alcohol, diethanolamine, mono- and di (lower) alkyl ethers of ethylene glycol and diethylene glycol, di-N-propylaniline, ethyl alcohol, methanol, n-propanol, i-propanol, ethyl isothiocyanate, ethyl isothiocyanate, ethylene glycol, 1,2-propylene glycol, 1,3-propylene glycol, 2-ethylhexanol, dimethylacetamide formamide, furfuryl alcohol, glycerol, hydroxyethylethylenediamine, isoamylalcohol, isoamyl sulfide, isobutyl mercaptan, methyl disulfide, dibutoxytetraethylene glycol, pyridine, trimethylene glycol, dioxane, dimethylsulfoxide, sulfolane, N-methylpyrollidine, and dimethylformamide, the dl-2-(6'-methoxy-2'-naphthyl)propionic acid salt was obtained.

EXAMPLE 3

Repeating the procedure of Example 1 with enriched l- or d - 2-(6'-methoxy-2'-naphthyl)propionic acid salts of cinchonine, quinine, quinidine, strychnine, brucine, morphine, 1-menthylamine, d-α-phenylethylamine, 1-α-phenylethylamine, d - 2-amino-1-hydroxy-hydrindine, 1-arginine, cinchonicine, d - α - (1 - naphthyl)ethylamine, 1-α-(1-naphthyl)ethylamine, d - α - methylbenzylamine, 1-α-methylbenzylamine, caffeine, L-2 - amino - 1 -propanol, 1 - α - aminobutanol, d-2-aminobutanol, D-threo-2-amino-1 - p - nitrophenyl - 1,3-propanediol, d-amphetamine, d-methylamine, 1-methylamine, cholesterylamine, N-cholesteryl aniline, L - 2-benzylamino-1-propanol, d-desoxyephedrine, 1 - ephedrine, d-dimethylamino-1,2-diphenyl-3-methyl - 2-butanol, 1-dimethylamino-1,2-diphenyl-3-methyl - 2 -butanol glucosamine, solanidine, conessive, arabasine, and dehydroabietylamine, the corresponding dl-2-(6' - methoxy - 2' - naphthyl)-propionic acid salts are obtained.

EXAMPLE 4

Following the procedure of Example 1 but replacing the enriched 1-2-(6'-methoxy-2'-naphthyl)propionic acid salt of cinchonidine with cinchonidine salts of enriched d- or l-salts of the following arylacetic acid, racemization is obtained:

2-(2'-naphthyl)propionic acid,
2-(6'-methoxy-2'-naphthyl)propionic acid,
2-(6'-ethynyl-2'-naphthyl)propionic acid,
2-(6'-difluoromethylthio-2'-naphthyl)propionic acid,
2-(6'-difluoromethoxy-2'-naphthyl)propionic acid,
2-(7'-difluoromethoxy-2'-naphthyl)propionic acid,
2-(1'-difluoromethoxy-6'-difluoromethylthio-2'-naphthyl) propionic acid,
2-(6'-hydroxy-2'-naphthyl)propionic acid,
2-(6'-methoxymethyloxy-2'-naphthyl)propionic acid,
2-(2'-naphthyl)-3,3-difluoropropionic acid,
2-(6'-vinyl-2'-naphthyl)propionic acid,
2-(6'-difluoromethoxy-8'-chloro-2'-naphthyl)propionic acid,
2-naphthylchloroacetic acid,
2-(6'-methyl-2'-naphthyl)propionic acid,
2-(6'-fluoro-7'-methoxy-2'-naphthyl)propionic acid,
2-naphthylfluoroacetic acid,
2-(6'-difluoromethylthio-1'-methoxy-2'-naphthyl)butyric acid,
2-(6'-isopropoxymethyloxy-2'-naphthyl)propionic acid,
2-(6'-methylthiomethyloxy-2'-naphthyl)propionic acid,
2-(6'-methoxymethylthio-2'-naphthyl)propionic acid,
2-(6'-methylthiomethylthio-2'-naphthyl)propionic acid, 2-(4',6'-di(methoxymethyloxy)-2'-naphthyl)propionic acid,
2-(6',7'-di(methoxymethylthio)-2'-naphthyl)propionic acid,
2-(7'-methoxymethylthio-2'-naphthyl)-3,3-difluoropropionic acid,
2-(6'-hydroxy-2'-naphthyl)-3,3-difluoropropionic acid,
2-[6'-(4''-methoxytetrahydropyran-4''-yloxy)-2-naphthyl]-3,3-difluoropropionic acid,
2-[6'-(tetrahydropyran-2'''-yloxy)-2'-naphthyl]-3,3-difluoropropionic acid,
6,8-bis(tetrahydrofuran-2'-yloxy)-2-naphthylfluoroacetic acid,
2-(6'-trifluoromethyl-2'-naphthyl)propionic acid,
2-(1'-methoxy-6'-trifluoromethyl-2'-naphthyl)butyric acid,
2-(7'-trifluoromethyl-2'-naphthyl)propionic acid,
2-(6'-trifluoromethyl-2'-naphthyl)-3,3-difluoropropionic acid,
2-(6'-hydroxymethyl-2'-naphthyl)propionic acid,
2-[6'-(1'''-hydroxyethyl)-2'-naphthyl]-3,3-difluoropropionic acid,
2-(6'-methyl-2'-naphthyl)butyric acid,
2-(1'-methyl-2'-naphthyl)propionic acid,
2-(1'-fluoro-2'-naphthyl)propionic acid,
2-(1'-methoxy-2'-naphthyl)propionic acid,
2-(1',6'-dimethylthio-2'-naphthyl)propionic acid,
2-(4'-ethyl-2'-naphthyl)butyric acid,
2-(4'-chloro-2'-naphthyl)propionic acid,
2-(4'-methoxy-2'-naphthyl)propionic acid,
2-(4'-methyl-6'-fluoro-2'-naphthyl)propionic acid,
2-(4'-fluoro-6'-methoxy-2'-naphthyl)propionic acid,
2-(6'-ethoxy-2'-naphthyl)propionic acid,
2-(6'-ethyl-2'-naphthyl)propionic acid,
2-(6'-methoxymethyl-2'-naphthyl)propionic acid,
2-(6'-isopropyl-2'-naphthyl)propionic acid,
2-(6'-chloropropyl-2'-naphthyl)propionic acid,
2-(6'-fluoro-2'-naphthyl)propionic acid,
2-(6'-chloro-2'-naphthyl)propionic acid,
2-(6'-chloro-2'-naphthyl)butyric acid,
2-(6'-acetyl-2'-naphthyl)propionic acid,
2-(6'-methylthio-2'-naphthyl)propionic acid,
2-(6'-ethylthio-2'-naphthyl)propionic acid,
2-(6'-fluoro-7'-methyl-2'-naphthyl)propionic acid,
2-(6'-methyl-7'-methoxy-2'-naphthyl)propionic acid,
2-(6'-methylthio-7'-fluoro-2'-naphthyl)propionic acid,
2-(7'-chloro-2'-naphthyl)propionic acid,
2-(7'-methoxy-2'-naphthyl)propionic acid,
2-(7'-methyl-2'-naphthyl)propionic acid,
2-(8'-methyl-2'-naphthyl)propionic acid,
2-(8'-ethoxy-2'-naphthyl)propionic acid,
2-(8'-fluoro-2'-naphthyl)propionic acid,
2-(8'-isopropylthio-2'-naphthyl)propionic acid,
2-(6',8'-dimethyl-2'-naphthyl)propionic acid,
2-(6',8'-dichloro-8'-methyl-2'-naphthyl)propionic acid,
2-(6'-ethoxymethyl-2'-naphthyl)propionic acid,
2-(6'-difluoromethoxy-2'-naphthyl)-3,3-difluoropropionic acid,
2-(6'-acetoxy-2'-naphthyl)propionic acid.

EXAMPLE 5

This example describes the formation of the 2-(6'-methoxy-2'-naphthyl)propionic acid salt of cinchonidine. 1.57 g. of cinchonidine is mixed with 20 ml. of methanol, and the mixture is stirred and heated to reflux temperatures until the cinchonidine is dissolved. To this hot solution (60–64° C.) is added a hot (60–64° C.) solution of 1.21 g. of dl-2-(6'-methoxy-2'-naphthyl)propionic acid in 10 ml. of methanol, forming a solution of the cinchonidine salt of dl-2-(6'-methoxy-2'-naphthyl)propionic acid.

Repeating this procedure but replacing the cinchonidine with cinchonine, quinine, quinidine, strychnine, brucine, morphine, 1-menthylamine, d-α-phenylethylamine, 1-α-phenylethylamine, d-2-amino-1-hydroxy-hydrindine, L-arginine, dehydroabietylamine, and other optically active nitrogeneous bases described in Example 3, the respective 2-(6'-methoxy-2'-naphthyl)propionic acid salts of the corresponding nitrogeneous bases are formed.

EXAMPLE 6

The solution of the dl-2-(6'-methoxy-2'-naphthyl)propionic acid salt of cinchonidine, prepared by the procedure of Example 1, was cooled to 60° C. To this solution was then added 3 ml. of methanol and pure d-2-(6'-methoxy-2'-naphthyl)propionic acid cinchonidine salt seed crystals. The resulting mixture was slowly cooled to room temperature and filtered, the separated solids comprising a mixture of 90 weight percent by weight of the cinchonidine salt of d-2-(6'-methoxy-2'-naphthyl)propionic acid and 10 percent by weight of the cinchonidine salt of 1-2-(6'-methoxy-2'-naphthyl)propionic acid.

The separated solids were recrystallized by repeating the above procedure to increase the purity of the d-2-(6'-methoxy-2'-naphthyl)propionic acid salt of cinchonidine.

The resolved crystals of the d-salt of cinchonidine was added to 60 ml. of 0.2 N hydrochloric acid. The resulting mixture was stirred for two hours and then extracted with diethyl ether to recover d-2-(6'-methoxy-2'-naphthyl)propionic acid and separated cinchonidine.

EXAMPLE 7

The filtered mother liquor enriched in l-arylacetic acid-cinchonidine salt from the filtration steps of Example 6 are collected and racemized by the procedure described in Example 1 to yield a solution of the corresponding racemized arylacetic acid salt of cinchonidine.

EXAMPLE 8

The racemized arylacetic acid salt solution obtained by the procedure of Example 7 is treated by the procedure described in Example 6 and filtered, the separated solids comprising a mixture of resolved d-2-(6'-methoxy-2'-naphthyl)propionic acid salt and unresolved dl-2-(6'-methoxy-2'-naphthyl)propionic acid salt.

As an alternate procedure, the racemized acrylacetic acid salt solution obtained in Examle 7 is recycled and mixed with fresh cinchonidine salt solution of dl-2-(6'-methoxy-2'-naphthyl)-propionic acid (prepared by the procedure of Example 1) and treated by the crystallization procedure described in Example 6.

EXAMPLE 9

The solution of the dl-2-(6'-methoxy-2'-naphthyl)-propionic acid salt of dehydroabietylamine prepared by the procedure of Example 3 was cooled to 60° C. To this solution was then added 3 ml. of methanol and pure 1-2-(6'-methoxy-2'-naphthyl)-propionic acid-dehydroabietylamine seed crystals. The resulting mixture was slowly cooled to room temperature and filtered, the separated solids comprising a mixture of resolved 1-2-(6'-methoxy-2'-naphthyl)propionic acid-dehydroabietylamine salt and unresolved dl-2-(6'-methoxy-2'-naphthyl)propionic acid dehydroabietylamine.

The separate solids were recrystallized by repeating the above procedure to increase the purity of the 1-2-(6'-methoxy-2'-naphthyl)propionic acid salt of dehydroabietylamine.

The resolved crystals of the l-salt of the dehydroabietylamine were added to the 60 ml. of 0.2 N hydrochloric acid. The resulting mixture was stirred for two hours and then extracted with diethyl ether to recover 1-2-(6'-methoxy-2'-naphthyl) propionic acid and dehydroabietylamine.

EXAMPLE 10

The filtered mother liquor enriched in d-acid salt, from the filtration steps of Example 9 are collected and racemized by the procedure described in Example 1 to yield a solution of the corresponding racemized dl-acid salt.

EXAMPLE 11

The racemized arylacetic acid salt solution obtained by the procedure of Example 10 is treated by the procedure described in Example 9 and filtered, the separated solids comprising a mixture of resolved 1-2-(6'-methoxy-2'-naphthyl)propionic acid salt and unresolved dl-2-(6'-naphthyl)propionic acid salt.

As an alternate procedure, the racemized arylacetic acid salt solution obtained in Example 10 is recycled and mixed with the fresh dehydroabietylamine salt solution of dl - 2-(6'-methoxy-2'-naphthyl)propionic acid (prepared by the procedure of Example 3) and treated by the crystallization procedure described in Example 9.

I claim:

1. A process of racemizing an α-substituted d- or l-arylacetic acid represented by the formula:

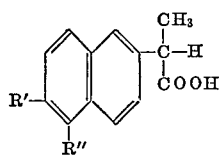

wherein R' is selected from the group consisting of H, lower alkoxy, lower alkylthio, lower alkyl, hydroxy or a carboxylic acid ester thereof having from 1 to 12 carbon atoms, tetrahydropyran-2'-yloxy, tetrahydrofuran-2'-yloxy or 4' lower alkyltetrahydropyran - 4' - yloxy and R' is selected from the group consisting of H, Fl or Cl; consisting essentially of the step of maintaining a first inert organic polar racemizing solvent solution of a salt of predominately said d- or l-arylacetic acid and an asymmetric optically active nitrogeneous base at a temperature above 80° C. until racemization occurs, thus forming a solution of a salt of racemized arylacetic acid and the nitrogeneous base, the nitrogeneous base being selected from the group consisting of cinchonidine, cinchonine, quinine, quinidine, strychnine, brucine, morphine, 1-methylamine, d - α - phenylethylamine, 1-α-phenylethylamine, d-β-amino-1-hydroxyhydrindine, l-arginine, cinchonicine, d-α-(1-naphthyl)ethylamine, 1-α-(1-naphthyl)-ethylamine, d - α-methylbenzylamine, 1-α-methylbenzylamine, caffeine, L-2-amino-1-propanol, 1-α-aminobutanol, d - 2-aminobutanol, D-threo-2-amino-1-p-nitrophenyl-1,3-propanediol, d - amphetamine, cholesterylamine, N - cholesteryl aniline, L - 2-benzylamino-1-propanol, d-deoxyephedrine, 1-ephedrine, d-dimethylamino-1,2-diphenyl-3-methyl-2-butanol, l-dimethylamino-1,2-diphenyl-3-methyl-2-butanol, glucosamine, solanidine, conessine, arabasine, and dehydroabietylamine.

2. The process of claim 1 wherein the nitrogeneous base is cinchonidine.

3. The process of claim 2 including the step of crystallizing the arylacetic acid salt of the nitrogeneous base from a second crystallization solvent solution of the salt of the racemized acid and nitrogeneous base to yield crystals of the salt containing a greater proportion of d-acrylacetic acid salt than the solution from which it is crystallized and leaving a solution of predominately l-arylacetic acid salt, wherein the d-arylacetic acid salt of the nitrogeneous base is less soluble in the crystallization solvent than the coresponding salt of the l-arylacetic acid.

4. The process of claim 3 wherein at least some of the salt of predominately d- or l-arylacetic acid and an optically active nitrogeneous base in the first inert organic racemizing solvent solution is prepared by crystallizing crystals of predominately the correspondingly opposite l- or d-arylacetic acid from a racemic mixture of l- and d-acids in a first crystallization solvent solution.

5. The process of claim 4 wherein the first and second crystallization solvent solutions are the same.

6. The process of claim 3 wherein a second racemizing solvent solution of the predominately l-arylacetic acid salt is maintained at a racemizing temperature until racemization occurs to form a solution of a salt of racemized arylacetic acid and nitrogeneous base, and arylacetic acid salt of the nitrogeneous base is crystallized from a third crystallization solvent solution of the salt of the racemized acid and nitrogeneous base to yield crystals of the salt containing a greater proportion of d-arylacetic acid salt than the solution from which it is crystallized.

7. The process of claim 6 wherein the first and second racemizing solvent solutions are the same and the second and third crystalization solvent solutions are the same.

8. The process of claim 2 including the step of crystallizing arylacetic acid salt of the nitrogeneous base from a second crystallization solvent solution of the salt of the racemized acid and nitrogeneous base to yield crystals of the salt containing a greater proportion fo l-arylacetic acid salt than the original crystallization solvent solution and leaving a solution of predominately d-arylacetic acid salt, wherein the l-arylacetic acid salt of the nitrogeneous base is less soluble in the crystallization solvent than the corresponding sat of the d-arylacetic acid.

9. The process of claim 8 wherein at least some of the salt of predominately d- or l-arylacetic acid and an optically active nitrogeneous base in the first inert organic racemizing solvent solution is prepared by crystallizing crystals of predominately the correspondingly opposite l- or d-arylacetic acid from a racemic mixture of l- and d-acids in a first crystallization solvent solution.

10. The process of claim 8 wherein a second racemizing solution of the predominately d-arylacetic acid salt is maintained at a racemizing temperature until racemization occurs to form a solution of a salt of racemized arylacetic acid and nitrogeneous base, and arylacetic acid salt of the nitrogeneous base is crystallized from a third crystallization solvent solution of the salt of the racemized acid and nitrogeneous base to yield crystals of the salt containing a greater proportion of l-arylacetic acid salt than the solution from which it is crystallized.

11. The process of claim 2 wherein the α-substituted arylacetic acid is 1,2 - (6-methoxy-2-naphthyl)propionic acid.

References Cited

UNITED STATES PATENTS

| | | | |
|---|---|---|---|
| 2,833,823 | 5/1958 | Zienty | 260—501.1 |
| 3,198,834 | 8/1965 | Beregil et al. | 260—501.1 |
| 3,341,593 | 9/1967 | Zeile et al. | 260—501.1 |
| 3,454,626 | 7/1969 | Gottstein | 260—501.1 |
| 3,520,931 | 7/1970 | d'Ostrowick et al. | 360—501.1 |

LEWIS GOTTS, Primary Examiner

J. R. BROWN, Assistant Examiner

U.S. Cl. X.R.

260—211 R, 239.5, 285, 289 A, 397.2, 501.1, 501.11, 501.17